Dec. 10, 1940.    M. JEANNERET    2,224,264
DENTIST'S DEVICE
Filed May 5, 1937
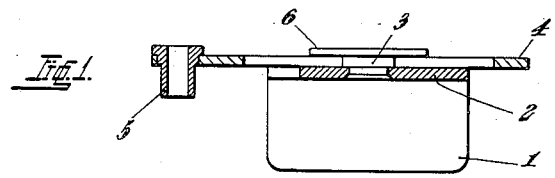
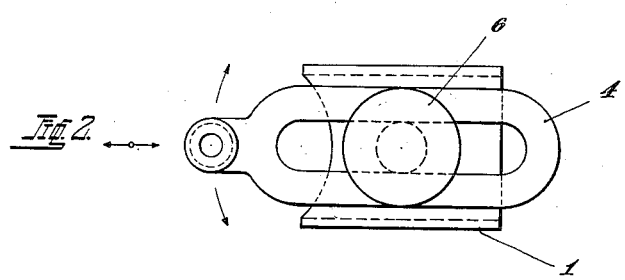
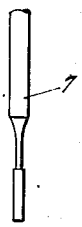 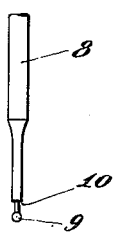
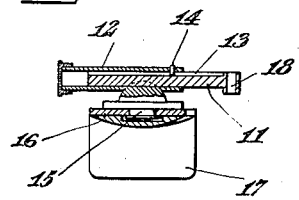
Max Jeanneret
INVENTOR
BY
his ATTORNEY.

Patented Dec. 10, 1940

2,224,264

UNITED STATES PATENT OFFICE 2,224,264

DENTIST'S DEVICE

Max Jeanneret, Berne, Switzerland

Application May 5, 1937, Serial No. 140,807
In Switzerland May 7, 1936

1 Claim. (Cl. 32—67)

Drillings for dental gold fillings up to a short time ago mostly were made in accordance with Black's method of backcutting in a mitre-joint fashion for the purpose of anchoring the filling in the bore. This method, however, possessed the disadvantage that a relatively great portion of the tooth had to be removed. Of late one therefore has preferred Boisson's method of anchoring the fillings by means of small studs and thus saving the body of the tooth as far as possible. For the purpose of this latter method, however, it is necessary to provide cylindrical bores with parallel axes for anchoring the said studs. The making of such cylindrical bores with accurately parallel axes, however, is a very difficult operation, since the dentist heretofore had to guide the drill free-handed and solely could rely on his eyesight. Aside from these cylindrical bores with parallel axes the dentist also has to make parallel-walled cuttings or millings the free-handed execution of which also is a very difficult affair.

The present invention relates to a device for making parallel-walled cuttings and cylindrical bores with parallel axes in teeth, and the objects of my invention are to overcome the difficulties mentioned.

The device according to my present invention comprises a holder to be detachably fastened to the teeth and a guide sleeve for the drill; the said sleeve being mounted on the said holder in such a way that it may be longitudinally displaced and rotatively adjusted relative to the latter.

The accompanying drawing shows two embodiments of the device according to my present invention, in which—

Fig. 1 is a longitudinal section through a first embodiment of the invention;

Fig. 2, a plan of the latter;

Fig. 3, a cutter belonging to the device;

Fig. 4, a drill belonging to the device; and

Fig. 5, a longitudinal section of a second embodiment of the invention.

The device shown in Figs. 1 and 2 comprises a frame or stirrup 1 made of metal and of U-shaped cross-section serving as holder. A pivot 3 is fastened to the web 2 of the said frame and carries a knob-shaped guide member 6 having guide faces extending in a plane at right angles to the pivot 3. A slotted guide rail 4 is mounted on the said guide member 6 longitudinally displaceable and rotatively adjustable thereto, and this rail 4 supports, at one end thereof a guide sleeve 5.

When applied, the device is set on a tooth adjacent to the tooth to be treated and, e. g., is fastened thereto by means of plaster of Paris. If the dentist has to make, e. g., parallel-walled recesses or cuts he only has to insert the cutter shown in Fig. 3 and which is connected to the drilling machine into the guide sleeve 5 and operate in any desired direction, since the guide sleeve—as indicated by the arrows in Fig. 2—may be moved in a horizontal plane in any desired direction. If, in addition, he has to drill cylindrical stud holes with parallel axes in the recess, the cutter is replaced by the drill shown in Fig. 4 and the latter inserted into the guide sleeve 5. Since the guide sleeve 5 is always displaced parallel to itself, all stud holes drilled will run parallel to each other.

As the stud holes with a clear width of about 0.6 mm. shall not be deeper than about 1½ to 2 mm., a shoulder 10 is provided on the drill 8 above the drill head 9 with a diameter of about 0.8 mm. The said shoulder 10 furthermore is located at such a distance above the drill head 9 that it comes in contact with the body of the tooth when it has reached the drilling depth mentioned above, and a further penetration of the drill head is made impossible.

In the second embodiment of the invention according to Fig. 5 the guide rail 11, here in the shape of a bar, is mounted longitudinally displaceable in a tube 12. A pin 14 connected to the said tube 12 and engaging a longitudinal groove 13 of the said rail 11 bars the latter from rotating about its longitudinal axis. The said tube 12, by means of a foot pin or journal 15, is rotative set into the web 16 of the U-shaped frame 17. The said rail 11 at its free end is provided with the guide sleeve 18.

The device according to my present invention not only may be used in the course of filling operations but also for lining up or railing of loose teeth.

The device, furthermore, may be so adapted that it can be taken apart for the purpose of a better cleaning. Means also may be provided for securing the guide rail in any position desired.

What I claim and desire to secure by Letters Patent is:

In a dental parallel device, a guide sleeve, a clamp for attaching the device to a single tooth other than the one to be treated, a pivot on said clamp having its axis disposed parallel to the bore in said guide sleeve, a guide member pivoted on said pivot and having guide means extending in a plane at right angles to said pivot, and an arm having one end thereof mounted on said guide member for longitudinal displacement along said guide means, said arm carrying on its free end said guide sleeve.

MAX JEANNERET.